(12) United States Patent
Keever

(10) Patent No.: US 6,378,470 B1
(45) Date of Patent: Apr. 30, 2002

(54) ROTARY ENGINE AND HELICOPTER APPLICATION

(76) Inventor: James R. Keever, 933 Ridgeview Pl., Canyon City, CO (US) 81212-9500

( * ) Notice: Subject to any disclaimer, the term of this patent is extended or adjusted under 35 U.S.C. 154(b) by 27 days.

(21) Appl. No.: 09/704,245

(22) Filed: Nov. 2, 2000

Related U.S. Application Data

(62) Division of application No. 09/371,663, filed on Aug. 10, 1999, now Pat. No. 6,193,189.

(51) Int. Cl.[7] ................................................ F02B 57/00
(52) U.S. Cl. .................... 123/44 R; 123/44 A
(58) Field of Search ............................. 123/43 R, 44 R, 123/44 A, 44 C

(56) References Cited

U.S. PATENT DOCUMENTS 3,730,148 A * 5/1973 Bagby ...................... 123/43 R

* cited by examiner

Primary Examiner—Noah P. Kamen
(74) Attorney, Agent, or Firm—G. F. Gallinger

(57) ABSTRACT

In a rotary engine having rotating cylinders which burns a fuel which is not mixed with oil there is a real problem of centrifugal force form the rotating engine causing oil to flow into the combustion chambers. The disclosed rotary engine has oil reservoirs which are positioned radially outwardly from the pistons so that centrifugal force resulting from engine rotation tends to keep oil out of the combustion chambers. A helicopter utilising this rotary engine comprises: an aircraft body; a rotary engine having a housing containing an upright crankshaft which has a lower end portion rotatably attached above the aircraft body; a first main lifting rotor centrally attached to an opposite upper end portion of the crankshaft of the rotary engine; and, a second main lifting rotor attached to the housing of the rotary engine so that when the rotary engine is operating the first main lifting rotor is rotated in one direction, and the engine and the second main lifting rotor together tend to rotate in an opposite direction. A brake mechanism allows the relative rotational speed of the rotors may be controlled.

7 Claims, 2 Drawing Sheets

ROTARY ENGINE AND HELICOPTER APPLICATION

PRIOR APPLICATION

This a divisional application of 09/371,663 filed Aug. 10, 1999, U.S. Pat. No. 6,193,189.

FIELD OF INVENTION

This invention relates to radial engines in which the cylinders revolve about the crankshaft. More particularly this invention relates to an improved radial engine having an oil reservoir positioned radially outside a cylinder and having its intake fuel mixture compressed by the power stroke of a piston. This relatively powerful light weight engine is ideally suited for use in a helicopter having two rotors, each revolving in an opposite direction about a common axis.

BACKGROUND OF THE INVENTION

In a conventional rotary engine the oil reservoir is positioned between the rotating cylinders. Centrifugal force tends to draw the lubricating oil into the combustion chamber. This was the primary drawback of the French Ghome engine in the first world war. In addition to smoking, consumption of oil could cause engine failure. This ongoing problem of oil seepage has greatly limited the use of the relatively light weight rotary engine.

In aviation particularly, there is a need great need for a reliable engine having a low weight: power ratio. Anything that can be done to reduce this weight: power ratio should be done. In helicopters, where every pound of load must be monitored because of high fuel costs, there is a particular need for an engine having a low weight: power ratio.

OBJECTS AND STATEMENT OF INVENTION

It is an object of this invention to disclose a design for a rotary which reliably solves the problem of lubricating oil being drawn into the cylinders. An engine which does not burn a mixture of fuel and oil. It is yet a further object of this invention to disclose a rotary engine which is super charged thereby resulting in an even lower weight: power ratio. It is a final object of this invention to disclose a helicopter which is designed to utilize this light weight engine. The disclosed design results in an even unexpectedly low weight: power ratio.

One aspect of this invention provides for an improvement in a rotary engine of the type having a block, cylinders generally radially arranged within the block, pistons slidably positioned in the cylinders defining combustion chambers on an inner side portion of the pistons in the cylinders, a central crankshaft, reciprocating piston rods having an inner end crankably connected to the crankshaft and an outer end connected to the pistons, and an oil reservoir, the improvement which comprises: said oil reservoir being positioned radially outwardly from the pistons so that centrifugal force resulting from engine rotation tends to keep oil out of the combustion chambers.

Another aspect of this invention provides for an engine as above further comprising a one way valve and a fuel manifold in the housing and wherein the engine is configured to draw a fuel mixture first through the one way valve into the fuel manifold on a compression stroke of the piston and compress the fuel mixture in the manifold on a power stroke of the piston so that when the piston begins an inlet stroke the pressurized fuel mixture will flow rapidly into the cylinder.

Yet a further aspect of this engine comprises a preferred use for the disclosed rotary engine. A helicopter comprising: an aircraft body surrounding a pilot; a rotary engine having a housing containing an upright crankshaft which has a lower end portion rotatably attached above the aircraft body; a first main lifting rotor centrally attached to an opposite upper end portion of the crankshaft of the rotary engine; and, a second main lifting rotor attached to the housing of the rotary engine so that when the rotary engine is operating the first main lifting rotor is rotated in one direction, and the engine and the second main lifting rotor together tend to rotate in an opposite direction, and a brake mechanism so that the relative rotational speed of the rotors may be controlled by the pilot.

Various other objects, advantages and features of novelty which characterize this invention are pointed out with particularity in the claims which form part of this disclosure. For a better understanding of the invention, its operating advantages, and the specific objects attained by its users, reference should be made to the accompanying drawings and description, in which preferred embodiments of the invention are illustrated.

FIGURES OF THE INVENTION

The invention will be better understood and objects other than those set forth will become apparent to those skilled in the art when consideration is given to the following detailed description thereof. Such description makes reference to the annexed drawings wherein.

Figure 1:
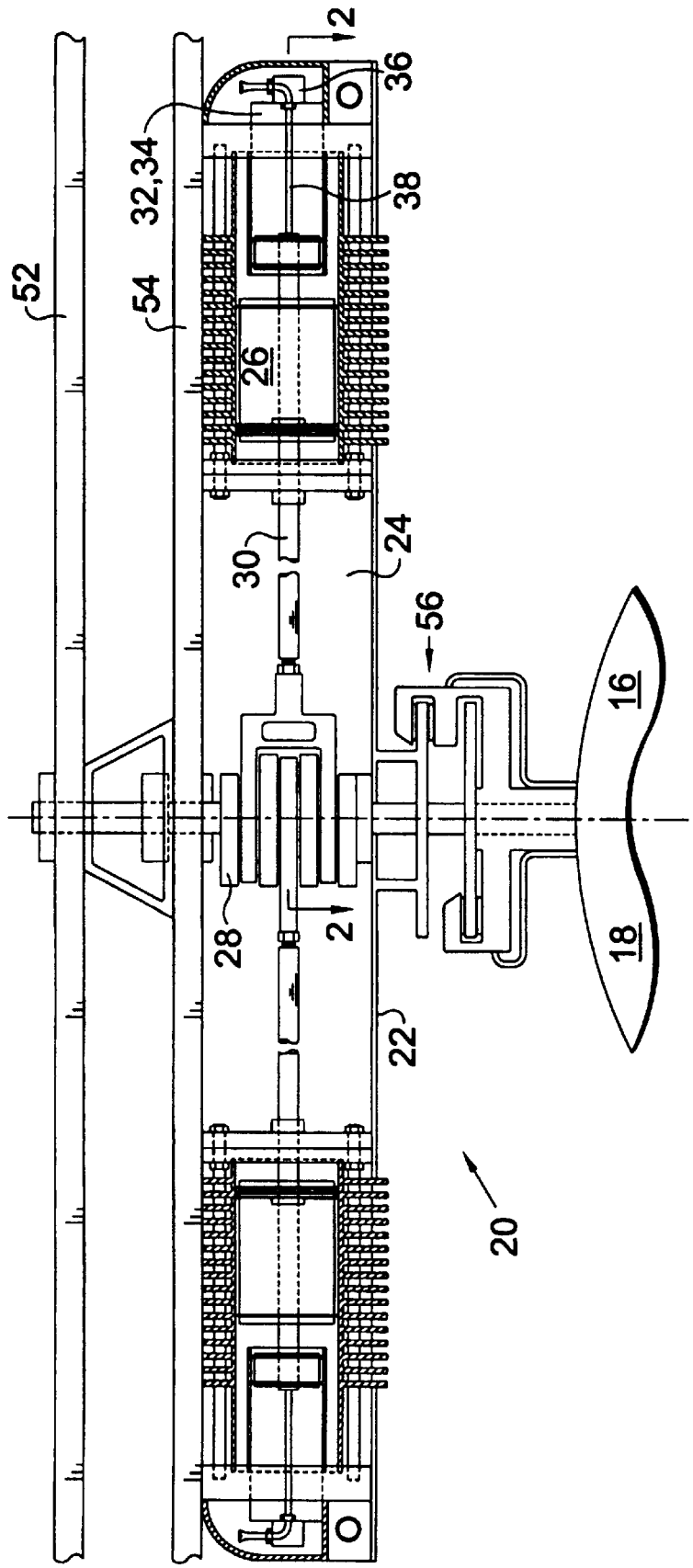
FIG. 1 is a cross sectional view of an improved rotary engine mounted on a helicopter.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a cross sectional view of an improved rotary engine 20 mounted on a helicopter 18. The rotary engine 20 is of the type having a housing 22, cylinders 24 generally radially arranged within the housing 22, pistons 26 slidably positioned in the cylinders 24 defining combustion chambers 25 on an inner side portion of the pistons 26 slidably in the cylinders 24, a central crankshaft 28, reciprocating piston rods 30 having an inner end crankably connected to the crankshaft 28 and an outer end connected to the pistons 26. An oil reservoir 32 is positioned radially outwardly from the pistons 26 so that centrifugal force resulting from engine 20 rotation tends to keep oil 34 out of the cylinders 24.

An oil pump 36 is positioned in alignment with an axis through a cylinder 24. The pump 36 comprises a hollow rod 38 containing two opposite one way valves 40. The pump 36 lubricates the pistons 26 within the cylinders 24. In the most preferred embodiment of the invention the pump 36 additionally pumps oil 34 through the piston rod 30 to lubricate the piston rod 30 moving out of the combustion chamber 25 and the crankshaft 28.

Figure 2:
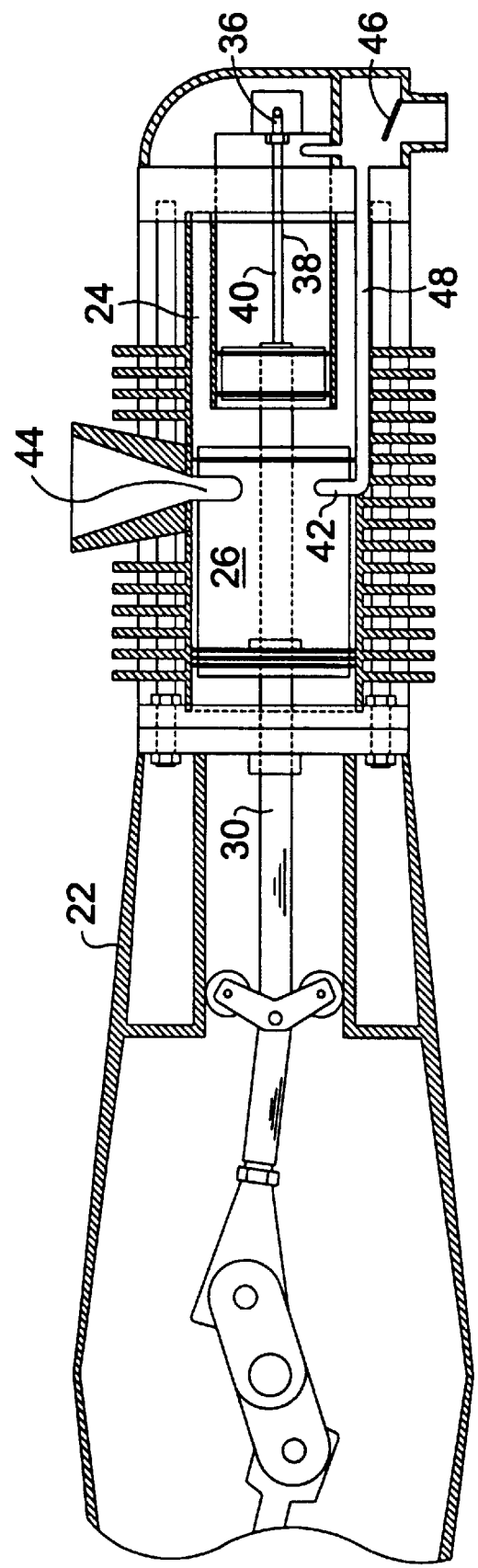
FIG. 2 is an enlarged plan view of a cylinder of the engine shown in FIG. 1 taken along line 1—1 therein. This view best shows the configuration of the intake and exhaust ports in the cylinder.

FIG. 2 is an enlarged plan view of a cylinder 24 of the engine 20 shown in FIG. 1 taken along line 1—1 therein. This view best shows the configuration of the intake 42 and exhaust port 44 in the cylinder 24. In the most preferred embodiment the engine 20 is configured to have a one way valve 46 and a fuel manifold 48 in its housing 22. On a compression exhaust stroke of the piston 24 a fuel mixture is drawn through the one way valve 46 into the fuel manifold 48. On a power stroke of the piston 24 the fuel mixture is compressed in the manifold 48 so that when the piston 24 begins an inlet stroke the pressurized fuel mixture will flow rapidly into the cylinder 24.

The disclosed radial engine 20 has an unusually low weight: power ratio. The engine 20 is ideally suited for use in a helicopter 18. A preferred embodiment of the helicopter 18 comprises: a rotary engine 20 having a housing 22 containing an upright crankshaft 28 which has a lower end portion rotatably attached above the aircraft body 16; a first main lifting rotor 52 centrally attached to an opposite upper end portion of the crankshaft 28 of the rotary engine 20; and, a second main lifting rotor 54 attached to the housing 22 of the rotary engine 20 so that when the rotary engine 20 is operating the first main lifting rotor 52 is rotated in one direction, and the engine 20 and the second main lifting rotor 54 together tend to rotate in an opposite direction. There are two brake mechanisms 56, one braking the first rotor 52, and one braking the second rotor 54, each braking with respect to the aircraft body 16 so that the relative rotational speed of the rotors 52,54 may be controlled by a pilot.

In the most preferred embodiment of the invention the engine 20 is a two cycle air cooled engine 20 and the cylinders 26 are sufficiently separated to provide ambient cooling. It should be noted that in this disclosed design for a helicopter 18, the engine may turn generally at two times the speed that it could turn if it were only driving one rotor 52. This helicopter design thus generally allows twice the power to be produced by the same size or weight of an engine because the engine can turn twice as fast, each rotor being rotated at half the engine speed which is its maximum RPM.

While the invention has been described with preferred specific embodiments thereof, it will be understood that this description is intended to illustrate and not to limit the scope of the invention. The optimal dimensional relationships for all parts of the invention are to include all variations in size, materials, shape, form, function, assembly, and operation, which are deemed readily apparent and obvious to one skilled in the art. All equivalent relationships to those illustrated in the drawings, and described in the specification, are intended to be encompassed in this invention. What is desired to be protected is defined by the following claims.

I claim:

1. In a rotary engine of the type having a block, cylinders generally radially arranged within the block, pistons slidably positioned in the cylinders defining combustion chambers on an inner side portion of the pistons in the cylinders, a central crankshaft, reciprocating piston rods having an inner end crankably connected to the crankshaft and an outer end connected to the pistons, and an oil reservoir, the improvement which comprises:

said oil reservoir being positioned radially outwardly from the pistons so that centrifugal force resulting from engine rotation tends to keep oil out of the combustion chambers.

2. An engine as in claim 1 further comprising an oil pump arranged to pump oil from the reservoir to lubricate the pistons within the cylinders.

3. An engine as in claim 2 wherein the pump is in alignment with an axis through a cylinder, and said pump further comprises a hollow rod containing a one way valve.

4. An engine as in claim 3 wherein there are two opposite one way valves in the pump.

5. An engine as in claim 4 wherein the pump additionally pumps oil through the piston rod to lubricate the crankshaft.

6. An engine as in claim 5 wherein the engine is a two cycle air cooled engine and wherein the cylinders are sufficiently separated to provide ambient cooling.

7. An engine as in claim 5 further comprising a one way valve and a fuel manifold in the housing and wherein the engine is configured to draw a fuel mixture first through the one way valve into the fuel manifold on a compression stroke of the piston and compress the fuel mixture in the manifold on a power stroke of the piston so that when the piston begins an inlet stroke the pressurized fuel mixture will flow rapidly into the cylinder.

\* \* \* \* \*